US007590497B2

(12) United States Patent
Tornquist et al.

(10) Patent No.: US 7,590,497 B2
(45) Date of Patent: Sep. 15, 2009

(54) AUTOMATIC GENERATION OF TOLERANCE SCHEMES

(75) Inventors: Clay Tornquist, East Greenwich, RI (US); Todd Jarvinen, West Greenwich, RI (US); Christopher Garcia, Foxboro, MA (US)

(73) Assignee: Dassault Systemes SolidWorks Corporation, Concord, MA (US)

( * ) Notice: Subject to any disclaimer, the term of this patent is extended or adjusted under 35 U.S.C. 154(b) by 522 days.

(21) Appl. No.: 11/243,354

(22) Filed: Oct. 4, 2005

(65) Prior Publication Data

US 2006/0106476 A1    May 18, 2006

Related U.S. Application Data

(60) Provisional application No. 60/616,396, filed on Oct. 5, 2004.

(51) Int. Cl.
*G06F 17/50* (2006.01)
(52) U.S. Cl. .................. 702/42; 703/1; 345/420
(58) Field of Classification Search .......... 702/42, 702/94–95, 97, 189; 703/1–2; 345/420–421, 345/855
See application file for complete search history.

(56) References Cited

U.S. PATENT DOCUMENTS

| | | | |
|---|---|---|---|
| 5,106,290 A | | 4/1992 | Carver et al. |
| 5,323,333 A | | 6/1994 | Johnson |
| 5,581,466 A | | 12/1996 | Van Wyk et al. |
| 5,586,052 A | | 12/1996 | Iannuzzi et al. |
| 6,963,824 B1 | * | 11/2005 | Davidson et al. ............ 703/2 |
| 2002/0015036 A1 | * | 2/2002 | Shiroyama et al. .......... 345/419 |
| 2002/0128810 A1 | | 9/2002 | Craig et al. |
| 2002/0143507 A1 | | 10/2002 | Lu et al. |
| 2002/0198680 A1 | * | 12/2002 | Sato et al. ................ 702/179 |
| 2003/0182090 A1 | | 9/2003 | Paladini et al. |

(Continued)

FOREIGN PATENT DOCUMENTS

EP    0 468 909 A2    1/1992

(Continued)

OTHER PUBLICATIONS

Chase, K., et al. "A Comprehensive System for Computer-Aided Tolerance Analysis of 2-D and 3-D Mechanical Assemblies," *Proceedings of the 5th International Seminar on Computer-Aided Tolerancing*, Toronto, Canada (1997), ADCATS Publication #97-4.

(Continued)

*Primary Examiner*—Eliseo Ramos Feliciano
*Assistant Examiner*—Mary C Baran
(74) *Attorney, Agent, or Firm*—Hamilton Brook Smith & Reynolds, PC

(57) ABSTRACT

Automatic generation of a tolerance scheme includes accessing data defining a three-dimensional model that defines a part for manufacture, identifying a tolerance feature in the three-dimensional model, determining at least one unconstrained degree of control for the tolerance feature, automatically creating a tolerance scheme for the tolerance feature, and rendering the tolerance scheme and the three-dimensional model in a window such that the tolerance scheme annotates the tolerance feature. The tolerance scheme is based on an engineering standard for communicating a tolerance and constrains the unconstrained degree of control.

19 Claims, 16 Drawing Sheets

U.S. PATENT DOCUMENTS

2004/0267391 A1    12/2004   Bohn et al.
2006/0129259 A1    6/2006   Tomquist et al.

FOREIGN PATENT DOCUMENTS

| EP | 1 645 925 | 4/2006 |
|---|---|---|
| JP | 63-147267 | 6/1988 |
| JP | 63-181076 | 7/1988 |
| JP | 63239557 | 10/1988 |
| JP | 06-223081 | 8/1994 |
| JP | 2002-0269158 | 9/2002 |
| JP | 2003-006241 | 1/2003 |

OTHER PUBLICATIONS

Patent Abstracts of Japan, Publication No. 63-239557, vol. 013, No. 043, Jan. 31, 1989.

Treacy, P. et al, "Automated Tolerance Analysis for Mechanical Assemblies Modeled With Geometric Features and Relational Data Structure," *Computer-Aided Design*, 23:6, pp. 444-453, (1991).

European Search Report dated Jan. 31, 2006, Application No. EP 05 29 2058.

Birgand, J., et al., "Technologie de Conception Mécanique (TCMEC)," *Ecole Centrale De Nantes*, France pp. 18-23, (2001).

European Extended Search Report dated Jan. 31, 2006, EP Application No. 05 292058.

* cited by examiner

| Feature | Tx | Ty | Tz | Rx | Ry | Rz | Size | Form |
|---|---|---|---|---|---|---|---|---|
| Mating Face | X | X | X | X | X | X | X | |
| Center Pin | X | X | X | X | X | X | X | |
| Flat | X | X | X | X | X | X | X | |
| Top | X | X | | | | X | X | |
| Bottom | X | X | | | | X | X | |
| Cyl1 | | | X | | | X | | |
| Cyl2 | | | X | | | X | | |
| Cyl3 | | | X | | | X | | |
| Pattern | | | X | | | X | | |

# AUTOMATIC GENERATION OF TOLERANCE SCHEMES

This application claims priority to U.S. Provisional Patent Application No. 60/616,396 filed Oct. 5, 2004 and entitled "Automatic Generation Of Tolerance Schemes."

BACKGROUND OF THE INVENTION

Computer-aided design (CAD) software allows a user to construct and manipulate complex three-dimensional (3D) models of parts and assemblies. A number of different modeling techniques can be used to create a 3D model. These techniques include solid modeling, wire-frame modeling, and surface modeling. Solid modeling techniques provide for topological 3D models, where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. Wire-frame modeling techniques, on the other hand, can be used to represent a model as a collection of simple 3D lines, whereas surface modeling can be used to represent a model as a collection of exterior surfaces. CAD systems may combine these and other modeling techniques, such as parametric modeling techniques. Parametric modeling techniques can be used to define various parameters for different features and components of a model, and to define relationships between those features and components based on relationships between the various parameters.

CAD systems may also support two-dimensional (2D) objects, which are 2D representations of 3D objects. Two- and three-dimensional objects are useful during different stages of a design process. Three-dimensional representations of a model are commonly used to visualize a model in a physical context because the designer can manipulate the model in 3D space and can visualize the model from any conceivable viewpoint. Two-dimensional representations of a model are commonly used to prepare and formally document the design of a model.

CAD systems may display tolerance information to specify manufacturing parameters for a model. Tolerance information can include allowable deviations from specified dimensions or locations of a feature. For example, a plus/minus tolerance specification can indicate an allowable positional deviation of a feature in a manufactured part.

Annotating a CAD model using a set of geometric dimensioning and tolerancing formulations enables a design engineer to communicate the configuration of a part or an assembly of parts to a manufacturing engineer. The International Standards Organization (ISO) and the American Society of Mechanical Engineers (ASME) establish design and manufacturing standards, which are uniform practices for stating and interpreting dimensioning and tolerancing data. Hereinafter, a set of dimensioning and tolerancing formulations applied to a single part or a single feature is referred to as a tolerance scheme. Engineering practice prescribes that tolerance schemes that annotate a part or assembly conform to the ASME 14.5M and ASME 14.5.1M national standard or the ISO R1101 international standard.

Annotating a 3D model or a 2D drawing that represents a 3D model in a manner that is clear, concise, and compliant to ASME and ISO dimensioning and tolerancing standards can be an arduous task. Furthermore, the amount of time engineers spend on creating tolerance schemes may be very time consuming. To insert an annotation that specifies a tolerance of a particular feature of a part, the entire part must be analyzed. This is required because a slight dimensional or positional change of one feature of a part may affect an acceptable dimension or position of another feature of the part.

Many engineers create tolerance schemes through a manual process. To create a tolerance scheme, an engineer determines which features of a part are interrelated in such a way as to affect the tolerances of other features. The features are prioritized to reflect the order that each will be toleranced during a manufacturing process. Often, an engineer looks up tolerances in reference materials before calculating a tolerance scheme. Additionally, engineers rely upon experience and training with the ASME and ISO national standards to correctly apply tolerances. Tolerance schemes that annotate 2D drawings may also require verification to assure all features have been correctly toleranced.

Some commercially available CAD systems aid the engineer in creating tolerance schemes. A CAD system may guide an engineer feature by feature through the part and query the engineer for the appropriate tolerances to be applied to each feature. Some CAD systems may perform syntax checking, semantic checking, or both after a tolerance scheme is specified. In the case of syntax checking, currently available CAD systems may check whether a tolerance scheme is a complete callout (i.e., an instruction). Syntax may be checked as the tolerance scheme is being created or after the tolerance scheme is complete. In the case of semantic checking, currently available CAD systems may check whether the type of tolerance (e.g., a position) is valid for the feature that the tolerance is specifying. Moreover, a CAD system may display only valid tolerance symbols for a particular feature and allow an engineer to select the appropriate symbol for the feature. For example, an engineer may be allowed to select a position, diameter, or circularity symbol for a hole feature, all of which would be valid; whereas, an engineer may only be allowed to select a flatness or parallelism symbol for a plane feature.

Datum reference frames establish the orientation of a part for manufacturing and establish measurement directions. Typically, more than one datum reference frame is required to tolerance the features of a part by serving as a reference for a feature. A CAD system may aid an engineer in creating a datum reference frame; however, the software may not check the semantics of the datum reference frame for validity against a geometric dimension and tolerancing (GD&T) standard, such as ASME 14.5M or ISO R1101.

Drawbacks of the current state of the art include the need for engineers to understand the esoteric rules for applying tolerances to parts and to determine the interrelationship of features in a part. A further drawback of the current state of the art is that currently available interactive methods may not rigorously conform to the ASME and ISO standards for specifying tolerance schemes and datum reference frames.

A 3D CAD system that provides an automatic process that defines and associates 3D tolerance data with a 3D model and a 2D representation thereof would reduce the need for engineers to understand the esoteric rules associated with applying tolerances to parts. Additionally, codifying the best practices for defining and applying tolerance chains would enhance the capabilities and ease of use of a 3D CAD system. Moreover, reducing the time taken to verify that a model has all features correctly toleranced and ensuring that a model is not over-constrained or under-constrained in terms of tolerances, would greatly enhance current state-of-the-art computerized systems.

SUMMARY OF THE INVENTION

In general, in one aspect, the invention features a computer-implemented method for automatic generation of a tolerance scheme. The method includes accessing data defining a three-dimensional model that defines a part for manufacture, identifying a tolerance feature in the three-dimensional model, determining at least one unconstrained degree of control for the tolerance feature, automatically creating a tolerance scheme for the tolerance feature, and rendering the tolerance scheme and the three-dimensional model in a window such that the tolerance scheme annotates the tolerance feature. The tolerance scheme is based on an engineering standard for communicating a tolerance and constrains the unconstrained degree of control. The tolerance scheme may be comprised of a dimension, size, orientation, or form tolerance.

Implementations may include constructing a table for determining an unconstrained degree of control for the tolerance feature, where the table identifies whether a tolerance feature is fully constrained, over-constrained, or has unconstrained degrees of control. A data structure may be constructed for storing information about degrees of control relevant to the tolerance feature and used for determining an unconstrained degree of control for the tolerance feature. The data structure may indicate which degrees of control are controlled, required to be controlled, and not required to be controlled.

A feature type of a tolerance feature may be analyzed to determine an appropriate tolerance. The feature type may be a plane and the tolerance scheme will then contain a form tolerance formulation. The geometric relationship may be perpendicular and the tolerance scheme will then have a perpendicularity tolerance formulation. The geometric relationship between the tolerance feature and a datum reference frame may also be analyzed.

Implementations may also include the application of one or more user-defined attributes for a location, a size, an orientation, a form, or an angle tolerance specification. Additionally, the three-dimensional model may be rendered as a two-dimensional drawing in a window.

The details of one or more embodiments of the invention are set forth in the accompanying drawings and the description that follows. Other features, objects, and advantages of the invention will be apparent from the description and drawings, and from the claims.

DESCRIPTION OF THE DRAWINGS

FIG. 11E is an illustration of a table containing a list of features.

DETAILED DESCRIPTION OF THE INVENTION

The present invention automatically generates tolerance schemes (i.e., a set of dimensioning and tolerancing formulations) from a set of rules that are used by engineers to calculate tolerances. The present invention frees engineers from calculating tolerance schemes, and from relying upon one's experience and training to correctly apply tolerances. Using the present invention, an engineer does not need to access reference materials to calculate tolerance schemes nor determine which features of a part are interrelated in such a way as to affect the tolerances of other features. Tolerance characteristics and tolerance types that need to be created for various features can be determined, and the order of manufacturing features can be predicted. In addition, all tolerance features of a part are ensured to have adequate tolerances applied for control while not over- or under-constraining any feature. Through automation, the time required to apply tolerances to a part is reduced, and thereby, the present invention enhances the capabilities of a computerized modeling system.

Figure 1:
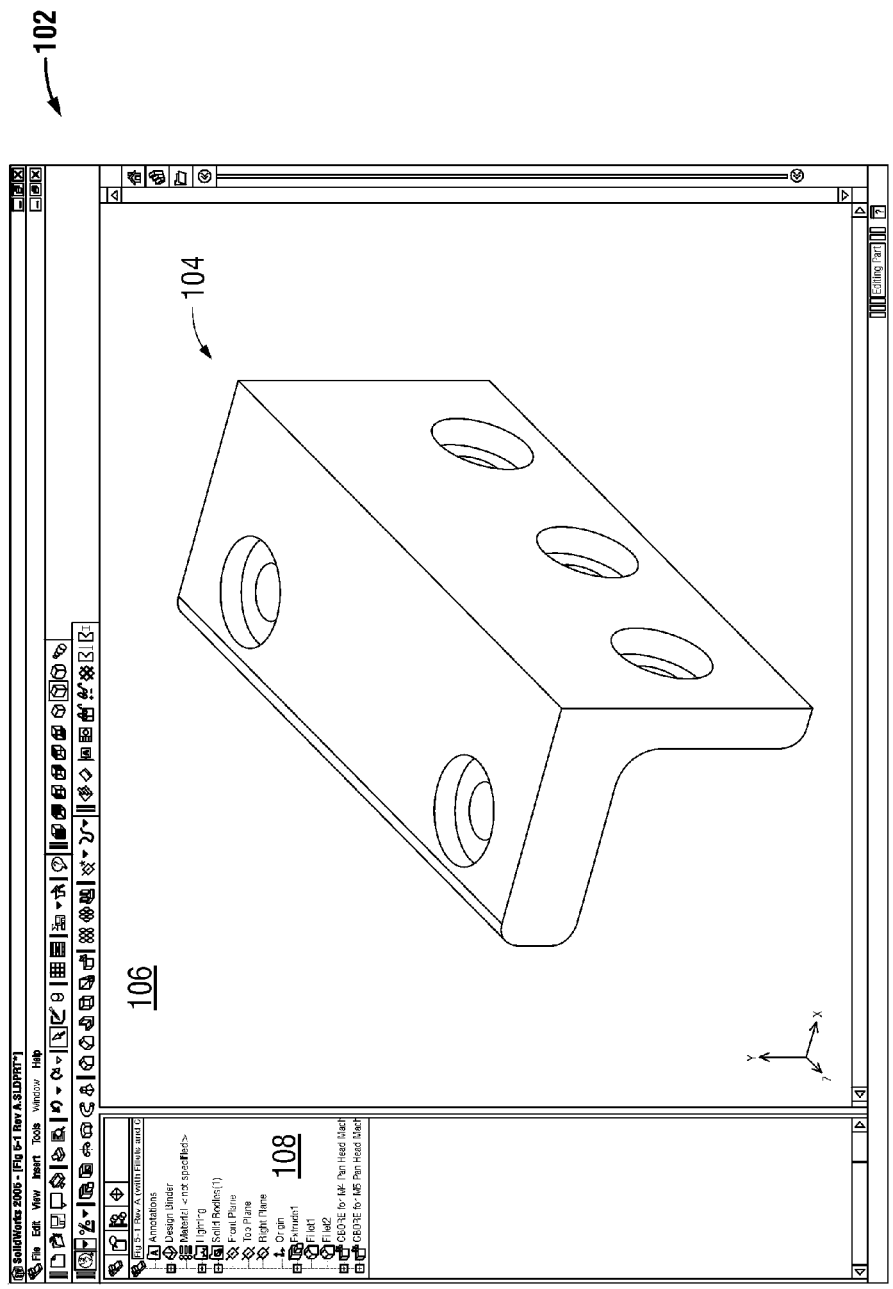
FIG. 1 is an illustration of a computer-generated model displayed in a window.
Figure 13:
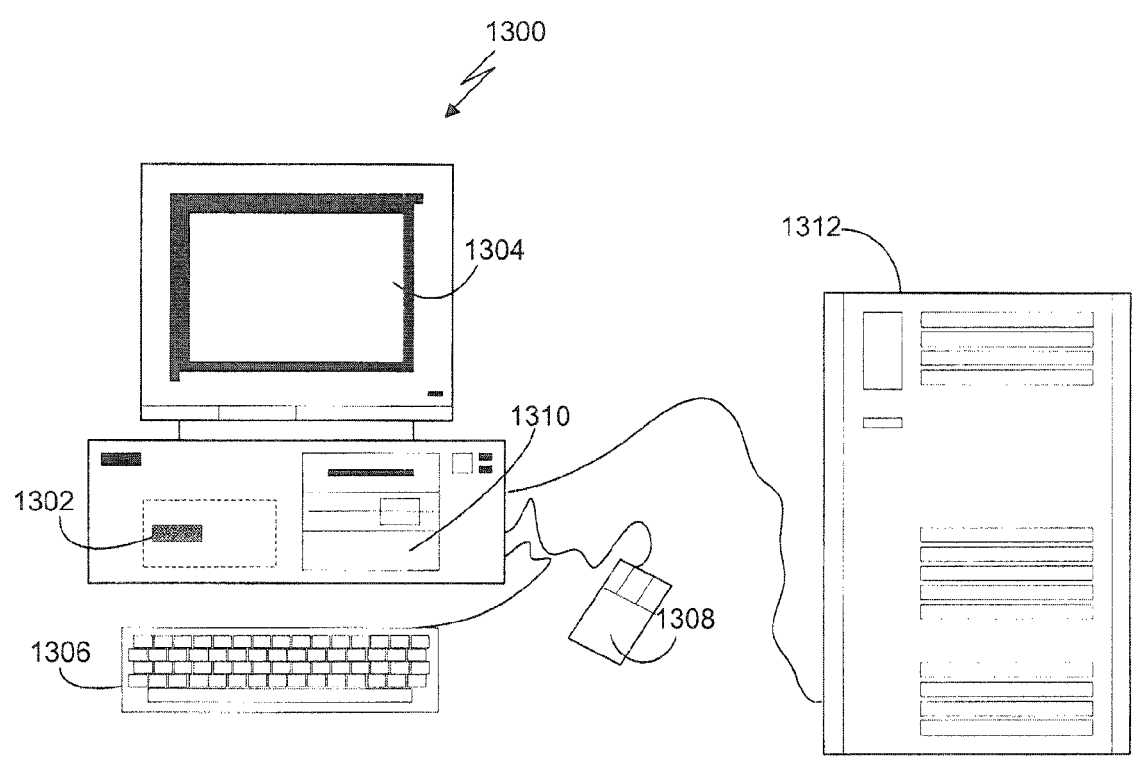
FIG. 13 is a diagram of a computer system.

FIG. 1 shows a window 102 displayed on a CRT and generated by modeling software executed by a computerized modeling system, an example of which is later shown with reference to FIG. 13. The window 102 is a conventional computer-generated window that can be programmed by one of ordinary skill in the art using conventional, commercially available, software programming tools, such as those available from Microsoft Corporation of Redmond, Wash.

A computer-generated 3D model 104 is displayed within a modeling portion 106 of the window 102. The surfaces of the 3D model 104 can be displayed, or the 3D model 104 can be displayed using solid lines and dashed lines to show visible edges and hidden edges, respectively, of the 3D model. Implementations also may include other window areas, such as a feature manager design tree 108, which helps the engineer visualize and manipulate the 3D model 104, as well as components of the 3D model 104.

Figure 2:
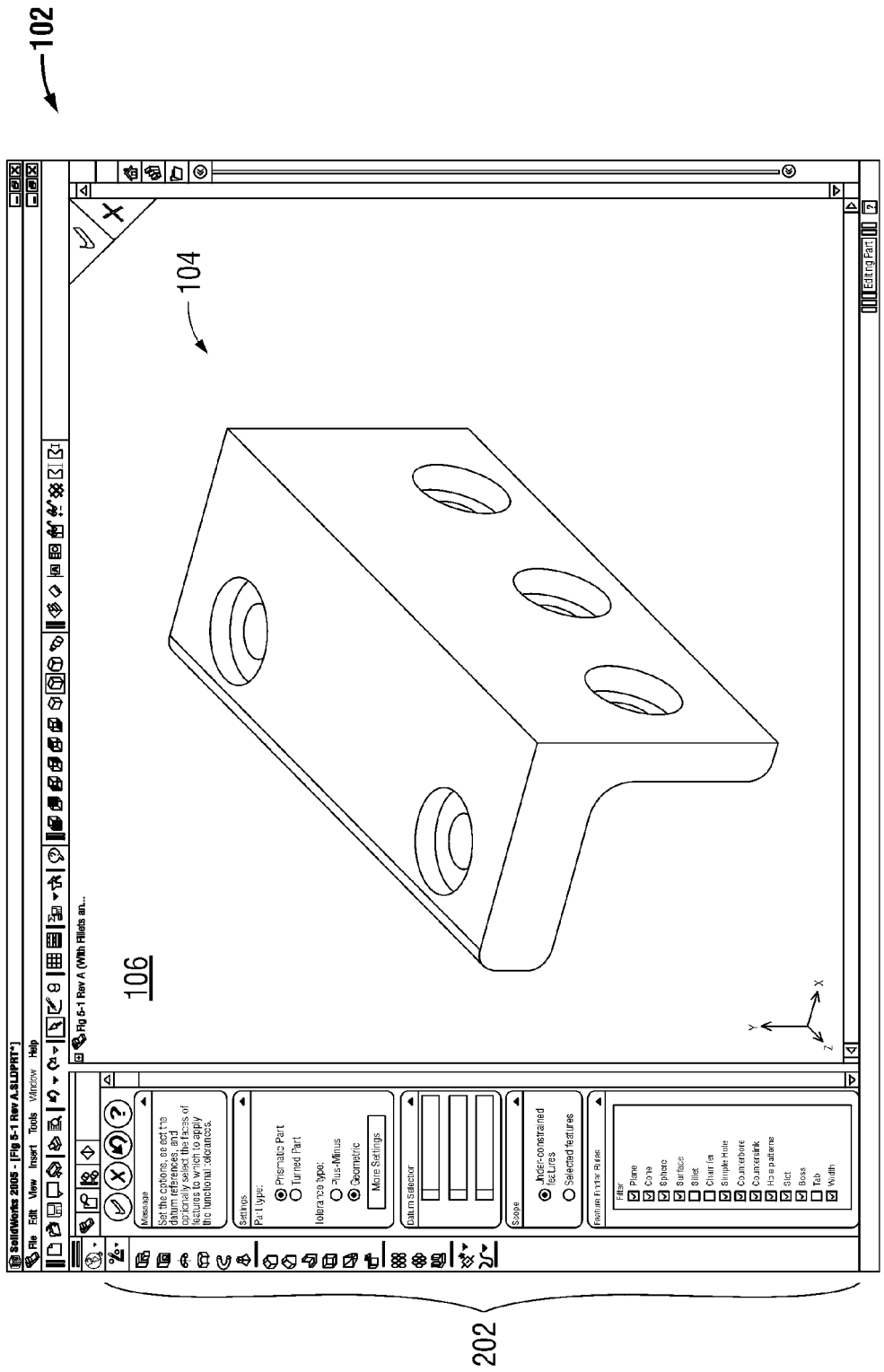
FIG. 2 is an illustration of a computer-generated model displayed in a window.

Referring now to FIG. 2, the window 102 contains the 3D model 104 displayed in a modeling portion 106 of the window 102 and a user interface panel 202. The user interface panel 202 appears after an engineer instructs the modeling system to initiate an automatic generative tolerance scheme (GTS) procedure and is used to establish parameters for the GTS procedure. Such parameters include the type of tolerancing (e.g., plus/minus or geometric according to ASME and ISO standards), a set of datum features, and whether the part is a prismatic or turned part.

Figure 3:
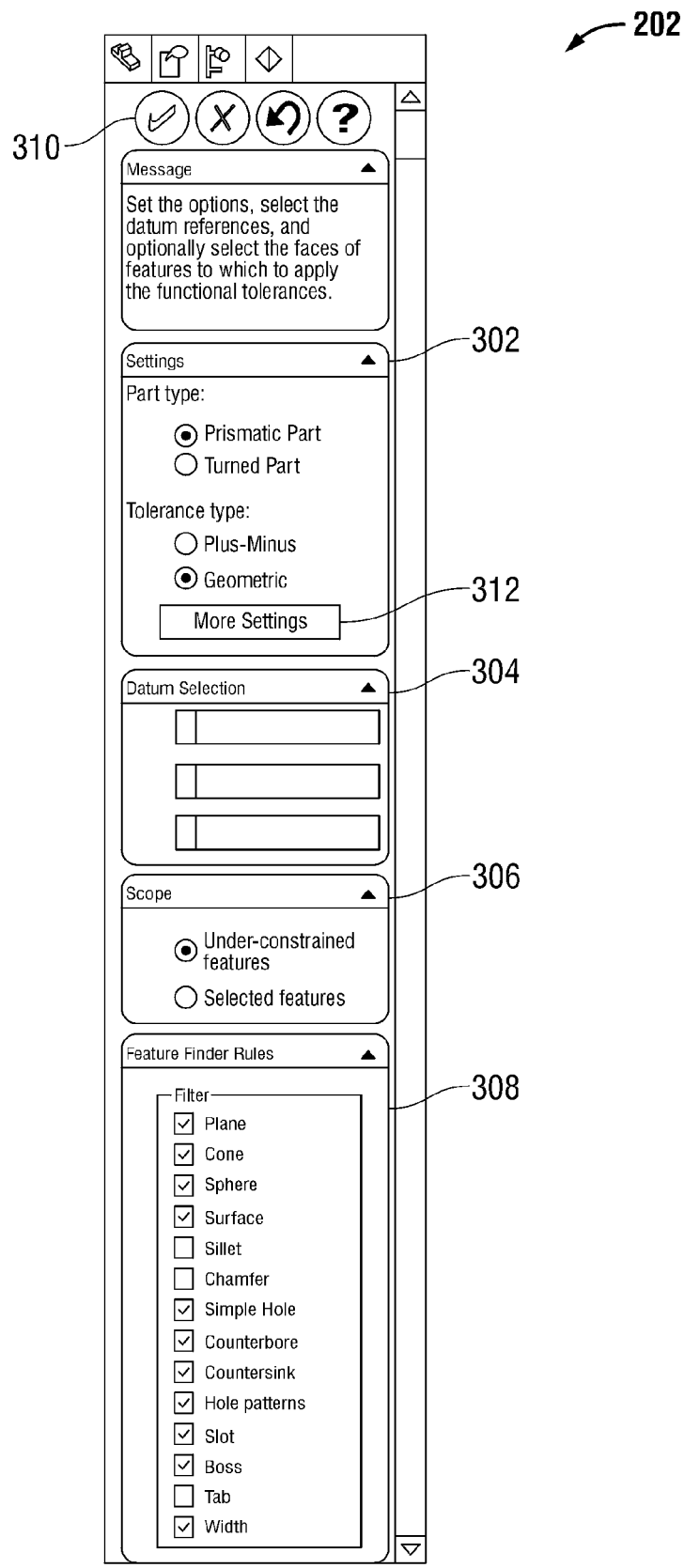
FIG. 3 is an illustration of a user interface.

FIG. 3 shows the user interface panel 202 in more detail. A Settings group box 302 enables the engineer to specify a part type and a tolerance type. The part type can be either a prismatic part or a turned part. The tolerance type can be a plus/minus tolerance type or geometric tolerance type. Other embodiments may allow for additional part types and tolerance types. Additionally, the Settings group box 302 accommodates additional settings that are accessible by pressing the More Settings button 312, which will be discussed with reference to FIG. 5.

Dimensioned parts and assemblies typically require one feature to be the starting location for calculating all dimensions; thus all other features are dimensioned with respect to that one feature. The one feature that is the starting location for dimensioning is referred to as the primary datum. Proper selection of the primary datum improves the ability to manufacture parts (e.g., by enhancing the part stability during the machining and inspection setup). In addition to the primary datum, a secondary datum may be specified to aid in the dimensioning calculations, and optionally, a tertiary datum may also be specified.

The user interface panel 202 contains a Datum Selection group box 304 to specify up to three datum references. The datum references can be selected by using a pointing device, such as a mouse, to pick the desired components of the 3D model that will be the datum references. Alternatively, an automatic process may determine the datum references.

Figure 4:
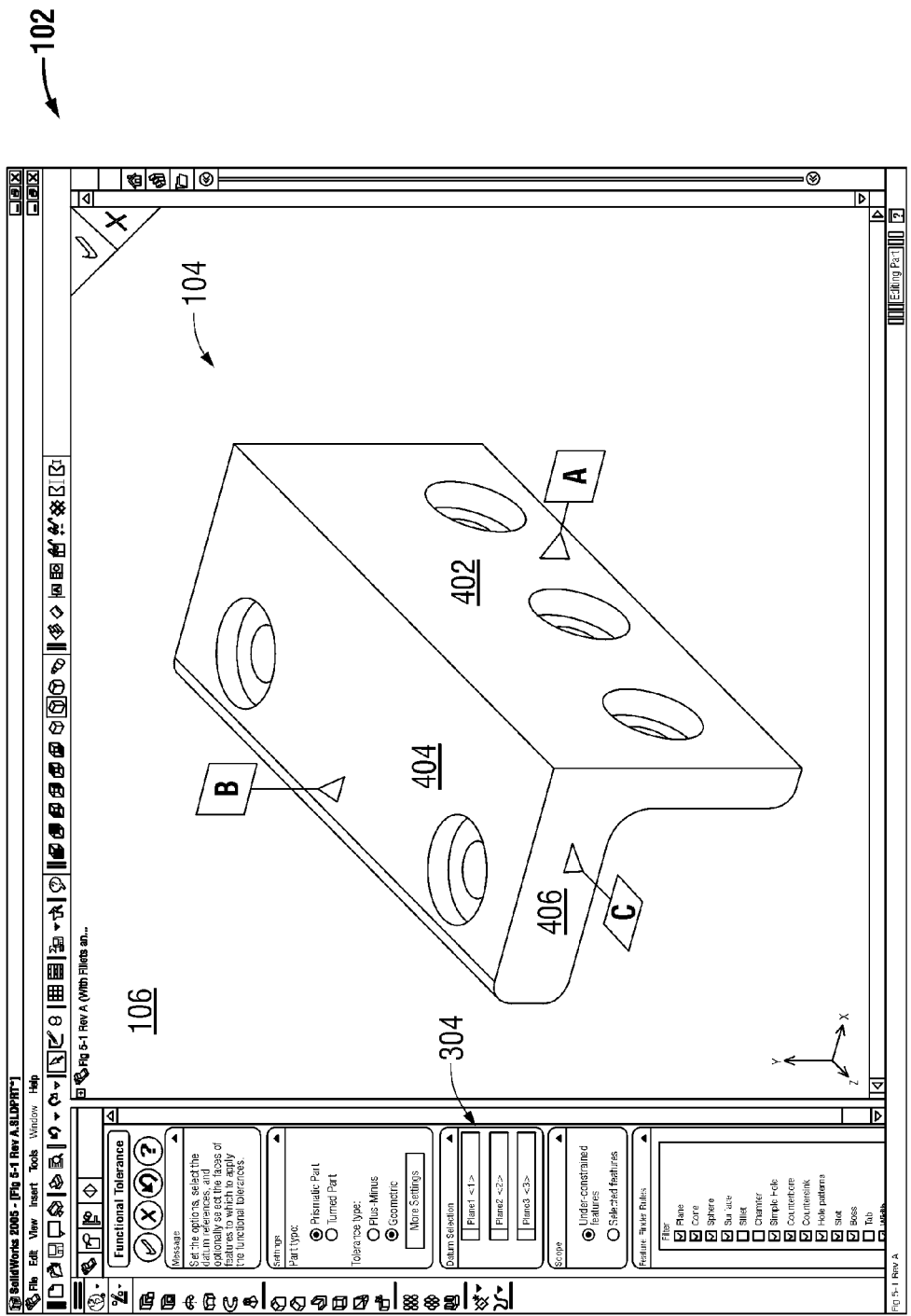
FIG. 4 is an illustration of a computer-generated model with specified datum reference frames.

Referring now to FIG. 4, the 3D model 104 having three specified datum references is shown in the modeling portion 106 of the window 102. The datum references may have been selected by picking three faces of model 104. The geometries of the selected faces are planes (i.e., trimmed surfaces) and indicated as such with a numeric identifier in the Datum Selection group box 304. Additionally, the datum references are labeled on the model 104. The primary datum 402, secondary datum 404, and tertiary datum 406 are denoted by the standard framed datum identifying symbols "A," "B," and "C."

Referring back to FIG. 3, other group boxes in the user interface panel 202 are used to establish parameters for the GTS procedure. The Scope group box 306 enables the engineer to specify whether only under-constrained features (which include features having no constraints and features that do not have the constraints required, as well as an entire part if the part had no tolerances), or only selected features should be considered by the automatic GTS procedure. The Feature Finder Rules group box 308 enables the engineer to indicate which kinds of features will be examined and toleranced during the automatic GTS process. Typically, manufacturing engineers do not tolerance filet, chamfer, and tab features, and as shown in FIG. 3, filet, chamfer, and tab are not selected.

A series of buttons appear at the top of the user interface panel 202. These buttons instruct the modeling system to calculate tolerance schemes, return to a program state that preceded the current state of the software application, undo the last set of automatically calculated tolerance schemes, and obtain help. When selected, the checkmark button 310 instructs the computerized modeling system to automatically calculate the tolerance schemes according to the parameters set in the user interface panel 202.

Figure 5:
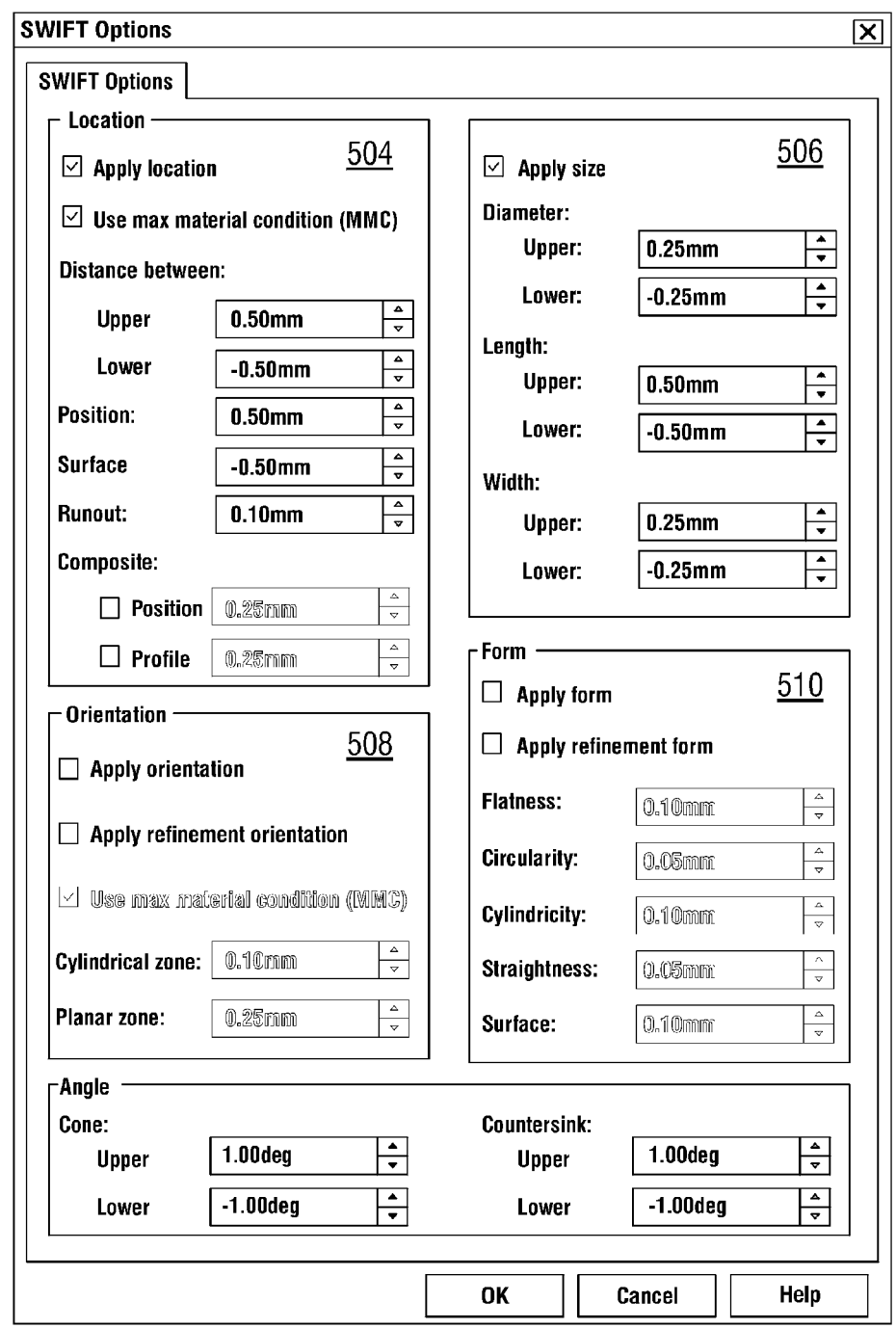
FIG. 5 is an illustration of a window displaying available options.

Referring now to FIG. 5, an options window 502 is shown. The options window 502 is displayed after the More Settings button 312 (shown in FIG. 3) is selected, and contains a set of parameters that may be specified in addition to the parameters shown in the user interface panel 202 (shown in FIGS. 2, 3, and 4). The options window 502 accommodates five distinct sections 504-512, each of which is applicable to a particular type of tolerance (i.e., location, size, orientation, form, and angle tolerances). Four of the distinct sections 504-510 have "Apply" checkboxes to indicate whether the type of tolerance should be automatically calculated for the part. An "Apply" checkbox does not appear in the Angle section 512 because angle tolerances are applied by default when size tolerances are applied.

The engineer may change the parameters shown in the options window 502, otherwise, default values will be used when a certain type of tolerance is applied. The default values are values that are suitable for a large range of parts or are values that are typically used as a standard for a large range of parts. For a particular feature that needs different values than those set in the options window 502, the engineer can create a unique tolerance scheme for that particular feature. The unique tolerance scheme will then be used as input to the automatic GTS procedure that calculates a set of tolerance schemes. Additionally, an embodiment of the present invention can have an expanded list of parameters. For example, additional parameters may be applicable to features of a specified diameter or diameter range.

Figure 6:
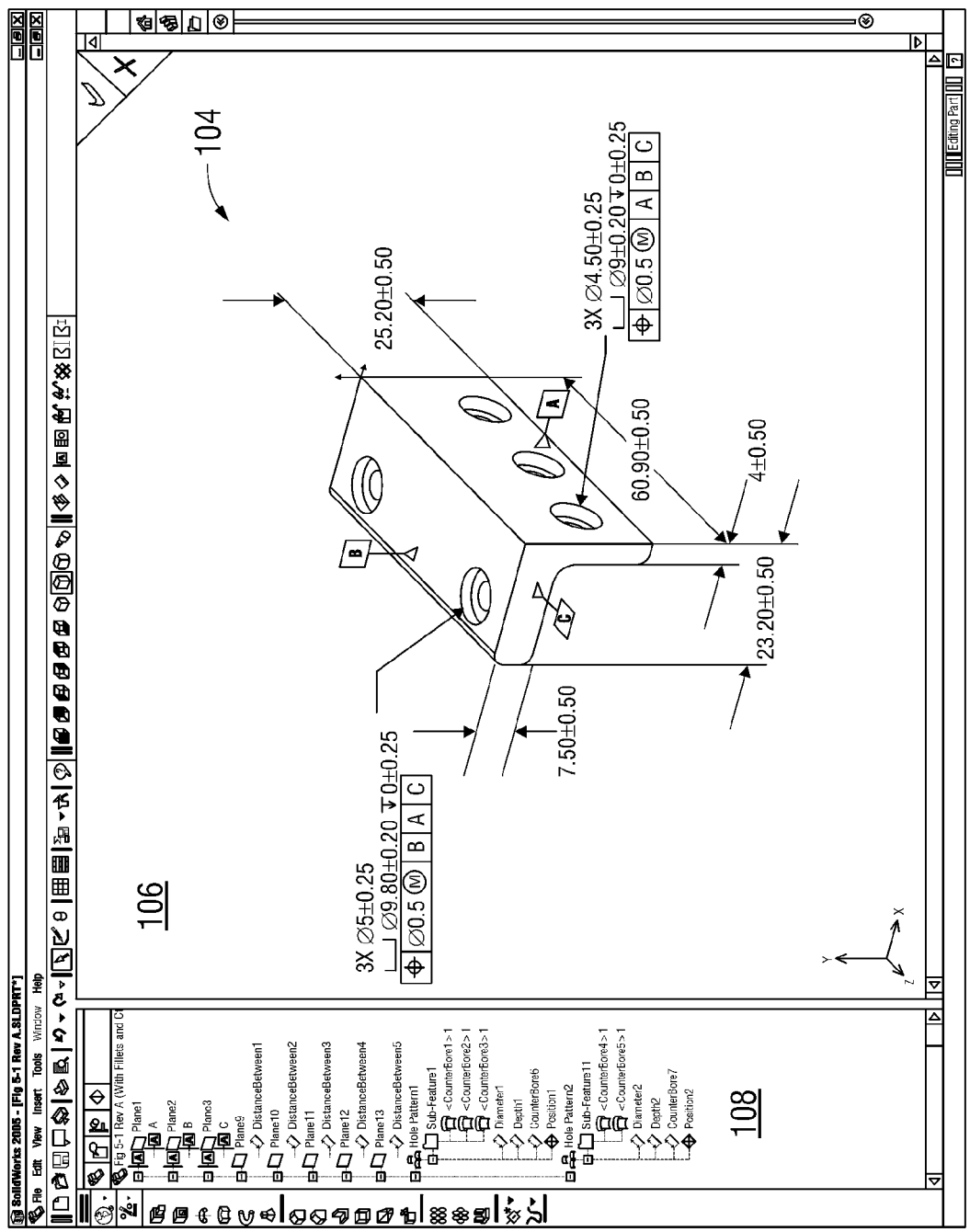
FIG. 6 is an illustration of an annotated computer-generated model.

Referring now to FIG. 6, model 104 is shown in window 102 with tolerance schemes that conform to ASME standards. The tolerance definitions are calculated automatically after the engineer presses the checkmark button 310 (shown in FIG. 3). Valid and complete geometric dimension and tolerancing (GD&T) tolerance schemes and plus/minus tolerance schemes are defined and annotate the model 104. In addition to the tolerance definitions, the datum reference frames are labeled A, B, and C, as is standard engineering practice.

Figure 7:
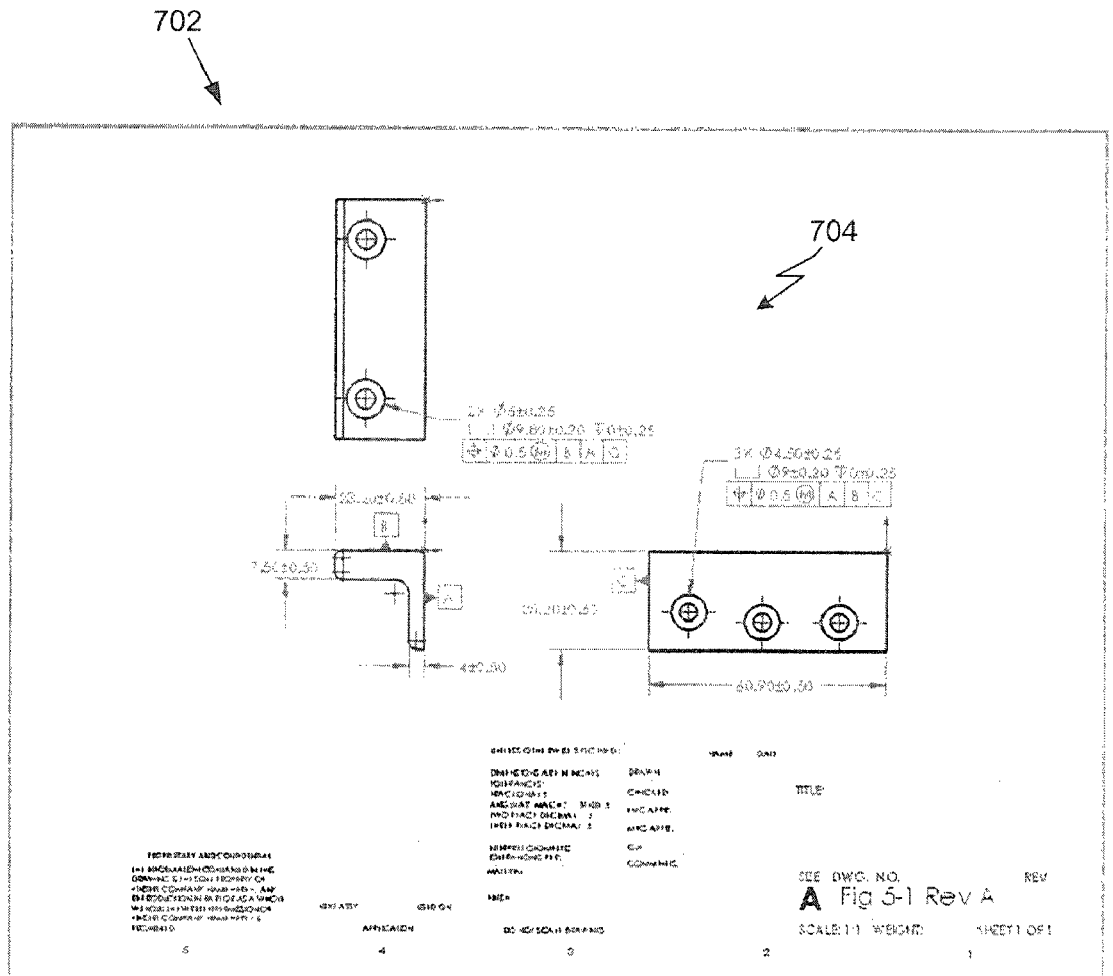
FIG. 7 is an illustration of an annotated 2D drawing.

FIG. 7 shows a window 702 that contains 2D views 704 of the model 104. The image displayed within window 702 is also referred to as a 2D drawing. Typically, 2D drawings are given to manufacturing engineers and communicate how the part should be manufactured. To communicate manufacturing information, the 2D views 704 include tolerance schemes.

To calculate the tolerance schemes shown in FIG. 6 and FIG. 7, a computerized modeling system executes a GTS procedure. The GTS procedure automates the creation of tolerance schemes based on knowledge of tolerance features, assembly mates, and the tolerance rules defined in ASME Y14.5M and ISO R1101.

The tolerance schemes automatically calculated by the present invention include a sequence of features and tolerances, and other information related to the features in the tolerance schemes (e.g., connectivity information). A part containing tolerance features, such as planes, holes, bosses, and cones, is used as input to the GTS procedure. All tolerances that have previously been used to define the part are further inputs to the GTS procedure. When working with an assembly of parts, the parts that are components of the assembly are input to the GTS procedure as are assembly methods that describe cross-part associations and connectivity relationships of assembly components.

A pre-existing tolerance scheme may have been manually created or may be present when a pre-defined part is loaded into the computerized modeling system. For example, a design engineer may add one or more required tolerance schemes to aid the manufacturing process. The present invention ensures that the unique requirements are considered in the automatic calculations of additional tolerance schemes. The GTS procedure will find all pre-existing tolerance definitions and tolerance schemes, which will not be overridden when additional tolerance schemes are calculated.

Figure 8:
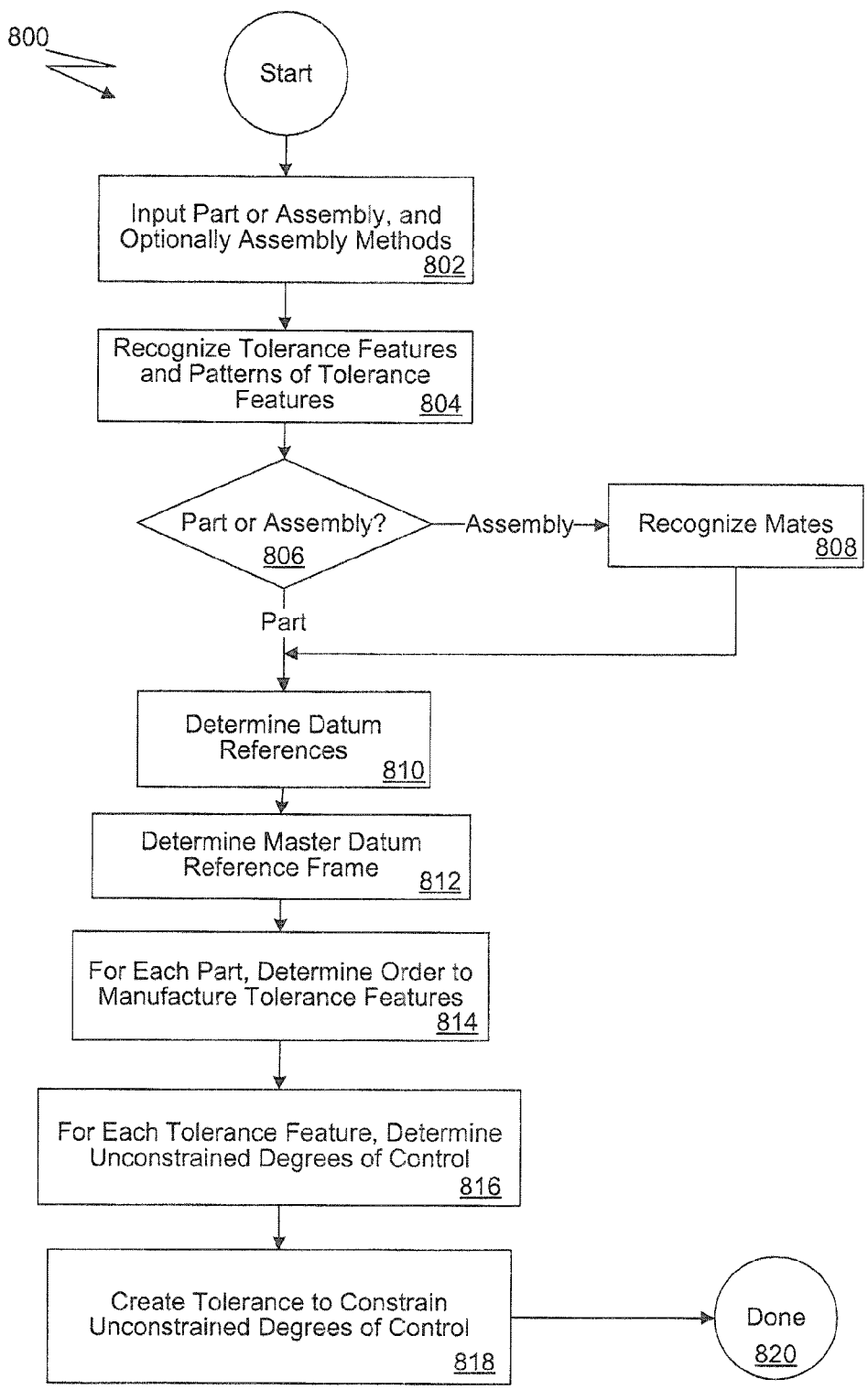
FIG. 8 is a flowchart of a procedure that automatically creates tolerances.

FIG. 8 is a flowchart of a GTS procedure 800. In the first step, procedure 800 receives input (802). The input, as previously discussed, includes a part or an assembly of parts, and may include pre-existing tolerance definitions and tolerance schemes (which may be included in part definitions), and assembly methods. Input is automatically received by the GTS procedure 800 once the checkmark button 310 (shown in FIG. 3) is pressed.

In the next step, tolerance features and patterns of tolerance features are recognized (804). Tolerance features are deduced from modeling features that are identified in the part or assembly. For example, a modeling feature that is identified as a hole will be recognized as a tolerance feature. The GTS procedure 800 recognizes the kinds of features selected in the Feature Finder group box 308 (shown in FIG. 3). Additionally, patterns of tolerance features are recognized. By way of non-limiting example, a pattern of slots (e.g., open, closed, square-end, and round-end slots) can be recognized as tolerance features, as can a pattern of holes (e.g., threaded holes or countersunk holes), and studs. Embodiments of the present invention can also recognize sheet metal features, 2D features, and constructed features.

Figure 9A:
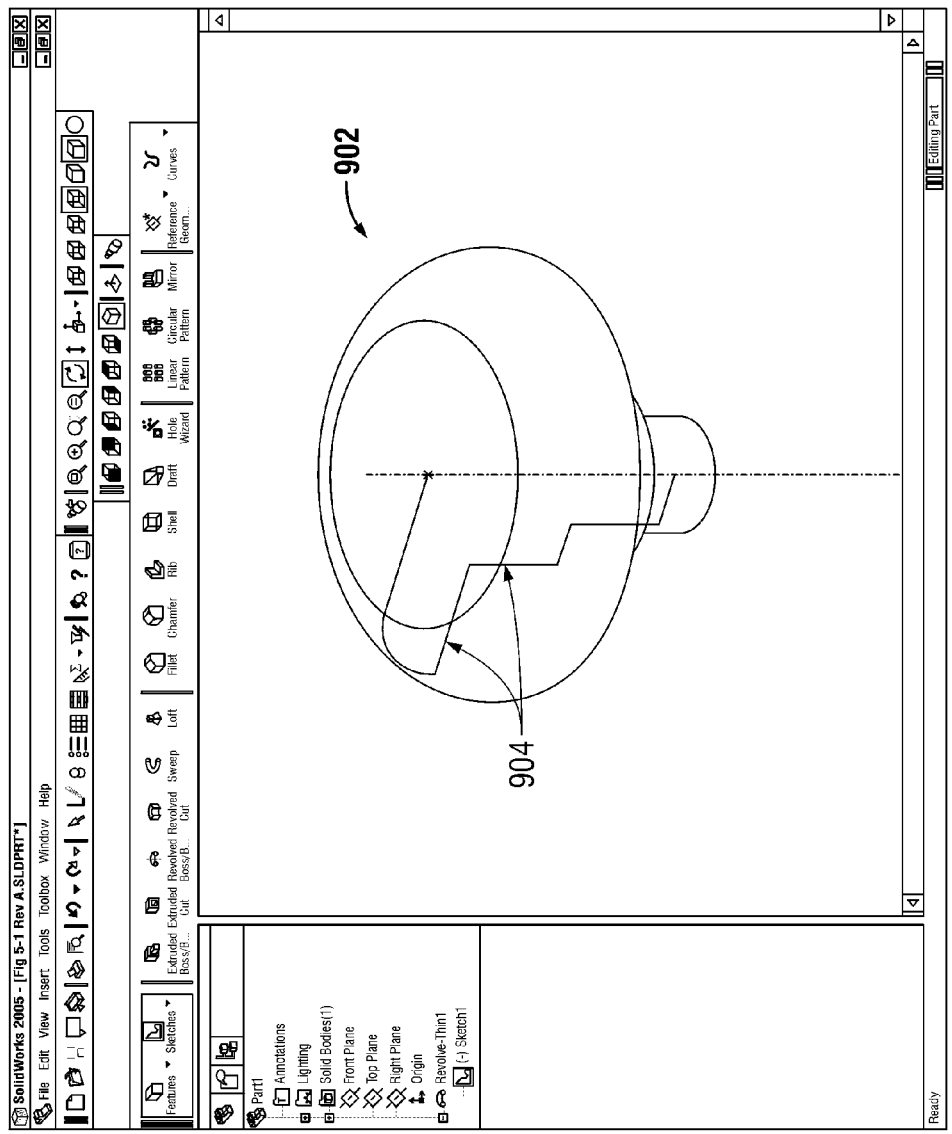
FIG. 9A is an illustration of a handle.
Figure 9B:
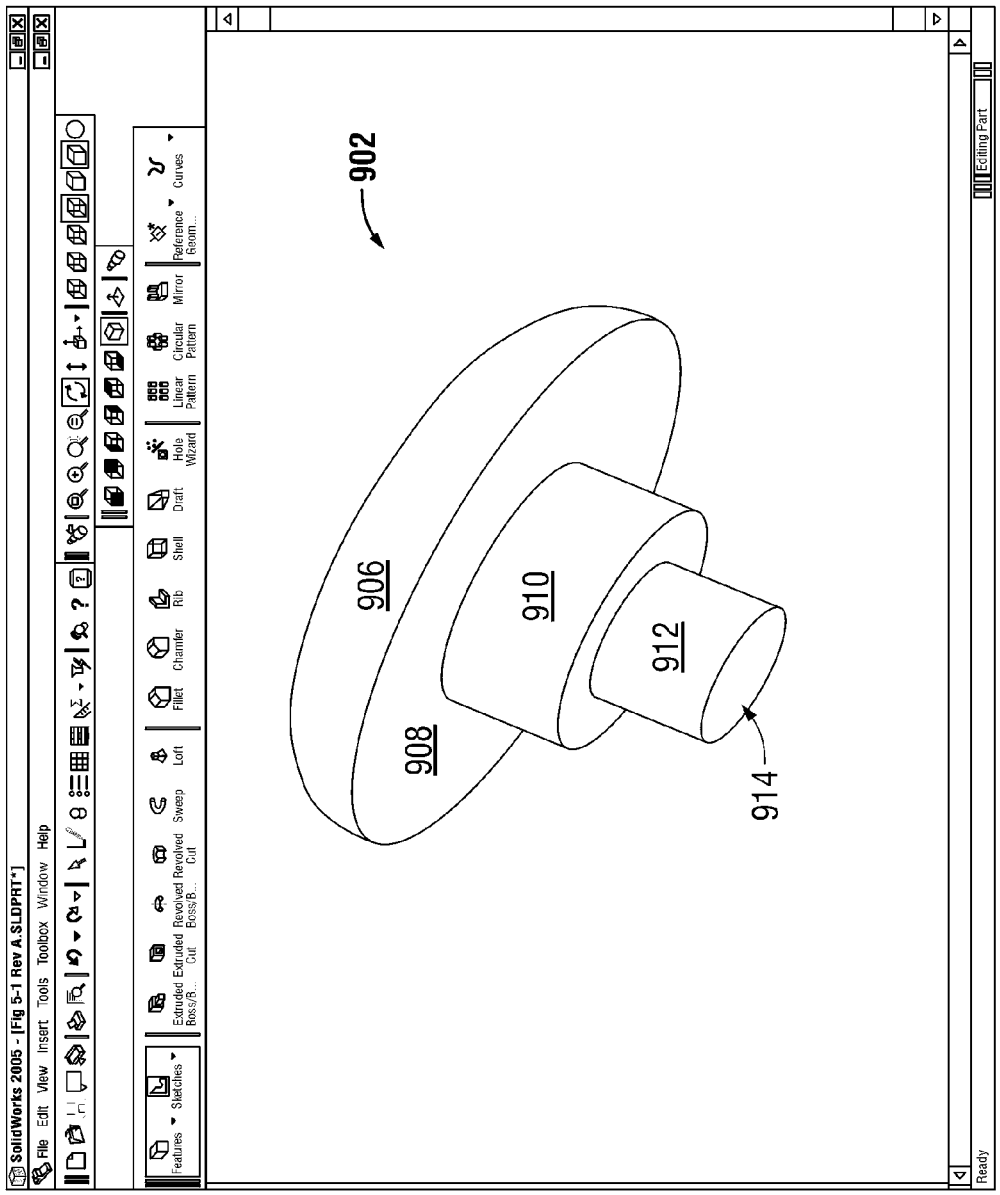
FIG. 9B is an illustration of a handle.

FIG. 9A and FIG. 9B illustrate differences between a modeling feature and tolerance features. FIG. 9A shows a handle 902 that is defined by a solid modeling revolve feature. A profile 904, when rotated, defines the final shape of the handle and creates a turned part. FIG. 9B shows several faces 906, 908, 910, 912, 914 of the handle that may be tolerance features. The profile 904 revolves to create a modeling feature; whereas, the faces 906, 908, 910, 912, 914 of the handle 902 may be considered tolerance features. A profile may also be extruded, in which case a prismatic part is created. Although, a profile may define an extrude feature, the extrude feature can have numerous faces that are tolerance features. Thus, modeling features do not always represent how a part may be produced or how a part is meant to function within a manufactured assembly. Tolerance features are a clearer representation of a model's geometry for use by manufacturing engineers and downstream automation systems.

Commercial feature recognition software that analyzes the topology of a CAD model and identifies features that are pertinent to manufacturing engineers is available from Geometric Software Solutions Company Limited of Bombay, India. Generally, such software may be used for step 804 in GTS procedure 800, although some enhancements may be necessary to recognize tolerance features that are not defined in the manufacturing or modeling feature recognition software libraries. One implementation of the current invention includes an enhancement that recognizes a notch as a tolerance feature. To recognize a notch feature, additional rules define the geometric characteristics of a notch (e.g., two parallel planes that are open at one end and bounded at the other end by a circular or flat surface).

Referring back to FIG. 8, in the next step, the GTS procedure 800 determines whether only one part was input or an assembly was input (step 806). An assembly requires additional processing in comparison to that of a part.

When an assembly is used as input to the GTS procedure 800, mates are also recognized (step 808). Mates are two or more parts that have compatible geometric characteristics. The parts are positioned with respect to one another such that at least one geometric modeling feature of one part is mated with at least one geometric modeling feature in another part. Commercially available CAD systems support mates. For example, SolidWorks® 2005 software, a product of SolidWorks Corporation of Concord, Mass., supports mates and identifies mate features within a data structure that defines an assembly of parts. To recognized mates, the GTS procedure 800 reads the assembly data structure and searches for features that are identified as mate features.

After a part or an assembly is input, and mates are recognized, the datum references are determined (step 810). In one embodiment, the mated features of the first mated part recognized in the assembly data structure are examined to determine whether a mated feature is a face and a tolerance feature or a possible tolerance feature. The first mated face that is determined to be a tolerance feature becomes the primary datum. If the first mated part has a second mated feature that is a face and a tolerance feature, then that second mated face becomes the secondary datum. Likewise, if the first mated part has a third mated feature that is a face and a tolerance feature, then that third mated face becomes the tertiary datum.

Other methods may be implemented to determine datums. For example, rather than examining the mated features of the mated part first recognized in the assembly data structure, another embodiment may first examine the mated part having the largest surface area. Moreover, once the datum references are determined, the engineer can specify one or more alternative datum references, thereby overriding one or more of the datum references that were automatically selected by the GTS procedure 800.

If a part (rather than an assembly) was input to the GTS procedure 800, several methods may be used to determine the datum references (step 810). One such method allows the design engineer to specify the primary datum, as was discussed with reference to FIG. 4. The datum references may also be determined automatically. In one embodiment, the surface areas of the tolerance features recognized in step 804 are calculated and the tolerance feature having the largest surface area is automatically chosen as the primary datum, which may be desired by standard engineering practices. Additional or alternative approaches to automatically choosing the primary datum may be implemented, such as identifying then selecting features that mate to one another as the primary datum.

After the determination of the possible datum references, the next step in the GTS procedure 800 determines the master datum reference frame (step 812), that is, a reference to where to begin manufacturing a part. The primary, secondary, and tertiary datum are analyzed to establish whether a valid master datum reference frame exists. This is accomplished by ensuring that the master datum reference frame conforms to the standard (e.g., ASME or ISO). For example, a primary and secondary datum plane cannot be parallel to one another, but can be perpendicular. To check validity, the feature type of the datum (e.g., plane, line, point) is located in a table that contains the rules according to the ASME standard regarding the valid datum relationships. The ASME standard defines these rules whereas the ISO standard implies that the rules exist. A preferred embodiment of the present invention utilizes only the ASME rules.

The GTS procedure 800 then determines the order in which tolerance features must be manufactured (i.e., constructed) to ensure that the physical part is as close to the ideal part defined by the computerized modeling system (step 814). The order is based upon existing tolerances and determined by requiring datum and reference features (on which pre-existing tolerances are based) to be manufactured before the features that are controlled by the datum and original features. The order of the datum (e.g., primary, secondary, tertiary) and construction options (e.g., specification of the construction order of certain features) also determine order. Generally, for each feature, a set of features that must be constructed prior to the construction of the feature in question is determined. A data structure that shows the order of construction is then generated.

Figure 10:
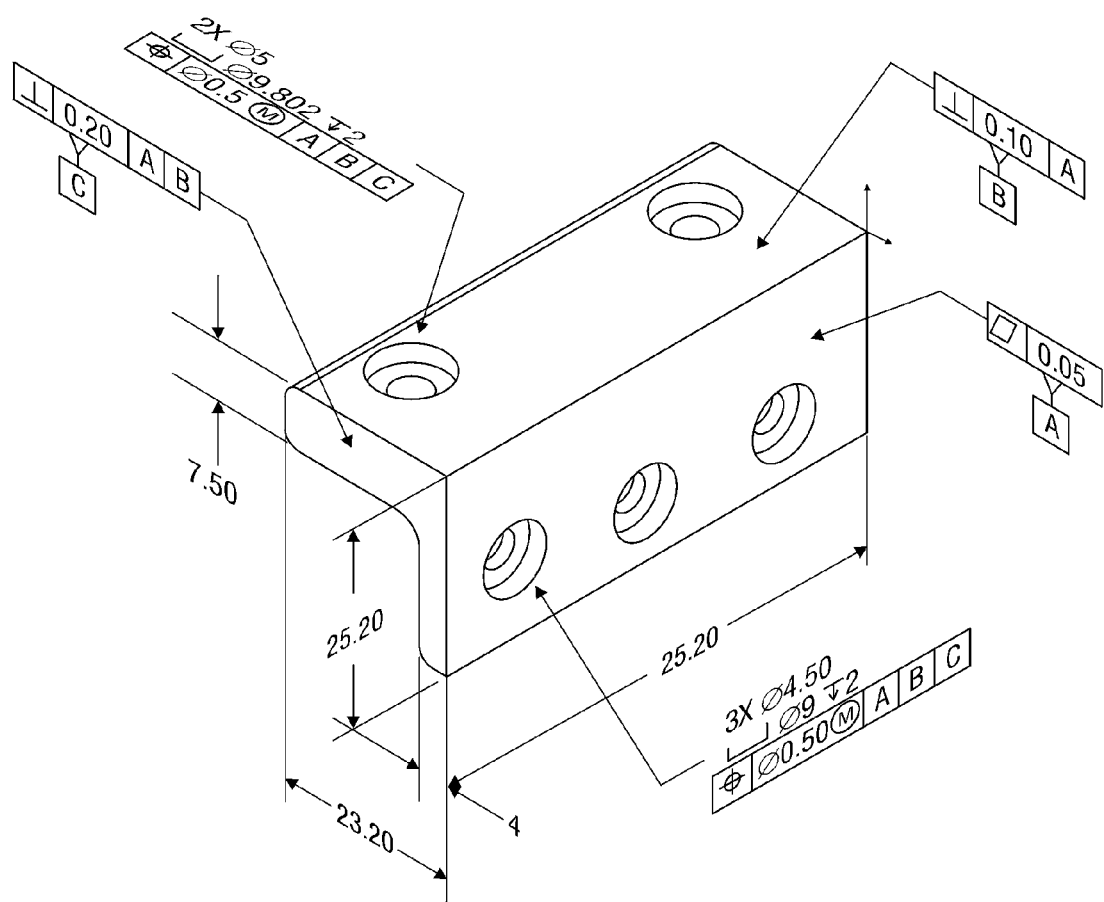
FIG. 10 is an illustration of a part.

The data structure showing the order of construction may take the form of a tree data structure or an ordered list. For example, the first, second and third items in an ordered list may be the primary, secondary, and tertiary datum features, respectively, followed by construction features (i.e., features derived from tolerance features or other construction features). A construction feature may also be created by the GTS procedure 800 when plus/minus dimensioning is a selected tolerance type setting and a hole's axis is not parallel to the datum features; in this case the hole is located relative to two construction points at the intersection of the hole's axis and the plane. Each tolerance feature is then analyzed to determine whether another tolerance feature is referenced (e.g., a pattern feature of two holes refers to the two holes, and thus, the two holes need to be manufactured first and need to precede the pattern item in the list). Moreover, features having pre-defined tolerances (e.g., defined explicitly by an engineer), are placed at the beginning of the ordered list. An example of a data structure showing the order of construction of the part shown in FIG. 10 may resemble the following:

Right
Datum A
Flatness
Top
Datum B
Perpendicular to A
Right
Datum C
Perpendicular to A and B
Counterbore1
Counterbore2
Counterbore3
HolePattern1
Diameter
Counterbore Diameter
Counterbore Depth
Position to A, B, and C
Counterbore4
Counterbore5
HolePattern2
Diameter
Counterbore Diameter
Counterbore Depth
Position to A, B, and C
Back
Distance to Front
Bottom1
Distance to Top
Left1
Distance to Right
Bottom2
Distance to Top
Left2
Distance to Right In the next step, the unconstrained degrees of control (e.g., degrees of freedom, form, and size) are determined for each tolerance feature (step 816). A table is built that enables the GTS procedure 800 to identify fully constrained and over-constrained tolerance features, in addition to identifying unconstrained degrees of control.

The GTS procedure 800 has embedded rules for matching feature types to tolerances required for the type of feature. For example, a notch feature type is required to have a size control such that the width and depth of a notch can be toleranced.

The rules for matching feature types to tolerances that are required for the feature also consider standard requirements. For instance, according to the Y14.5.1M standard, a hole that is a primary datum constrains locations X and Y, and rotations about X and Y. Moreover, a hole is a feature of size that requires a size tolerance and can be controlled (or constrained) for form. Given this, the GTS procedure 800 considers the Z translation and Z rotation unimportant in this case, and thus, both degrees of freedom can be ignored. In this example, the GTS procedure 800 would apply controls to constrain locations X and Y, rotations X and Y, Size, and Form.

Referring back to FIG. 8, the next step in the GTS procedure 800 creates tolerance schemes to constrain the unconstrained degrees of control for each tolerance feature (step 818). The correct tolerance scheme and attributes thereof (e.g., axis and diameter) are determined by the tolerance feature type, tolerance feature geometrical relationship to the datum reference frame, and attributes defined by the engineer (e.g., parameters described with reference to FIG. 5). For example, when the type of a tolerance feature is a plane, a form tolerance can be applied in a tolerance scheme for that feature. Given a feature type, the form type and other attributes may be found in a lookup table. The geometrical relationship between the tolerance feature and a primary datum reference is determined by analyzing the mathematical definition of the tolerance feature and primary datum reference. For example, the geometrical relationship may be perpendicular, in which case a perpendicularity tolerance is created to constrain the orientation of the tolerance feature with respect to the primary datum reference, if orientation tolerances are being applied. State of the art computer-aided design systems are available that determine the geometric relationship between features.

The process of creating tolerances to fully constrain the unconstrained degrees of control for each tolerance feature involves two steps. The first step is to define the tolerance schemes for the master datum reference frame.

To define the tolerance schemes for the master datum reference frame, the scheme for the primary datum is created first, given that the primary datum is the feature for which all features are oriented and located. Typically the primary datum requires size control, when applicable, and form control only (because location and orientation controls are automatically satisfied for the primary datum). In the special case where the primary datum is a compound datum (i.e., when multiple features are used to establish a single datum axis or plane), or pattern feature (e.g., hole pattern) controls to interrelate the location of the features are required.

Depending on the geometric relationship between the primary and secondary datum references, tolerances are added to control orientation and location of the secondary datum references. In the case where the datum feature requires control of size (e.g., holes, pins, slots, tabs, widths), size and form controls are also added as required. Depending on the relationships between the primary, secondary, and tertiary datum references, tolerances are added to control orientation and location of the tertiary datum references. In the case where one of the datum reference frames is of size, size and form controls are also added as required. For each of these aforementioned cases, tolerances will not be added that conflict with any pre-existing tolerances. For example, if a datum reference is a feature of size that has a size control, an additional size control will not be added.

The second step in fully constraining tolerance features is to define the independent tolerance schemes. In this second step, each tolerance feature in a part is considered in the order in which the tolerance feature appears in the data structure that defines the order of construction, which was previously discussed. For each tolerance feature, the degrees of control required by virtue of feature type and the pre-existing constraints for each tolerance feature are determined. Then, the tolerances necessary to fully constrain each feature are calculated.

The degrees of control include those for size, form, orientation, and location. When the degrees of control required by feature type are determined, the controls of no value or of no importance are marked as controlled. Controls of no importance, by way of non-limiting example, include the size applied to a plane, orientation about an axis of a hole, and location along an axis of a hole. A table listing the degrees of controls required for each feature is built. As an example, for a hole having an axis along the z-axis and with no pre-existing tolerances, the table may appear as follows:

| | |
|---|---|
| Size | Required |
| Form | Required |
| X-location | Required |
| Y-location | Required |
| Z-location | Controlled (not required) |
| X-rotation | Required |
| Y-rotation | Required |
| Z-rotation | Controlled (not required) |

When the pre-existing constraints for each tolerance feature are determined, pre-existing constraints are evaluated and may modify the required/controlled states of the degrees of control for the applicable tolerance feature. For example, given the hole used in the preceding example and for which a size and a perpendicularity tolerance (e.g., cylindrical zone) have been applied, the constraint status of the hole would appear as follows:

| | |
|---|---|
| Size | Controlled |
| Form | Required |
| X-location | Required |
| Y-location | Required |
| Z-location | Controlled |
| X-rotation | Controlled |
| Y-rotation | Controlled |
| Z-rotation | Not required (no such control about hole axis) |

The tolerances necessary to fully constrain each feature are applied in a prescribed order. First, the size controls as required are applied (e.g., diameter tolerances are applied to hole and sphere features, depth tolerances are applied to hole and counterbore holes, length and width tolerances are applied to slot features). Next, form controls as required are applied (e.g., circularity and cylindricity are applied to hole type features, flatness is applied to planes, and profile with no datum reference is applied to surface features). Then, orientation controls as required are applied (e.g., parallelism, perpendicularity, and angularity are applied and based on feature type). Finally, location controls as required are applied (e.g., position, linear plus and minus, and profile based on feature type are applied and user settings such as geometric tolerances versus plus and minus tolerance schemes).

When applying orientation and location tolerances, the relationships between the tolerances and datum features are evaluated to ensure tolerances are able to constrain the degrees of controls. When plus and minus tolerances are used to control the location of a feature an evaluation ensures the appropriate datums are used to set the origin feature for each plus and minus tolerance. For orientation, the proper orientation tolerance is applied depending upon whether the features are parallel, perpendicular, or at angles to one another.

For location, especially when plus and minus tolerancing is used, the relationships between the features are evaluated in order to determine which feature is the origin features for the location constraints.

When the GTS procedure 800 completes (step 820), tolerances that fully constrain each degree of control of all tolerance features are output. The tolerance data is embedded in the 3D model definition. Once embedded in the 3D model definition, the tolerance schemes can be automatically displayed to annotate the model in a 3D modeling portion of a window. The tolerance schemes can also be automatically displayed to annotate 2D drawing views of the 3D model when the 2D drawing views are rendered in a window. Additionally, the datum reference frames and tolerances can be listed in the feature manager design tree 108 (shown in FIG. 6), to visualize the relationships between the model components, the datum reference frames, and tolerances.

Figure 11A:
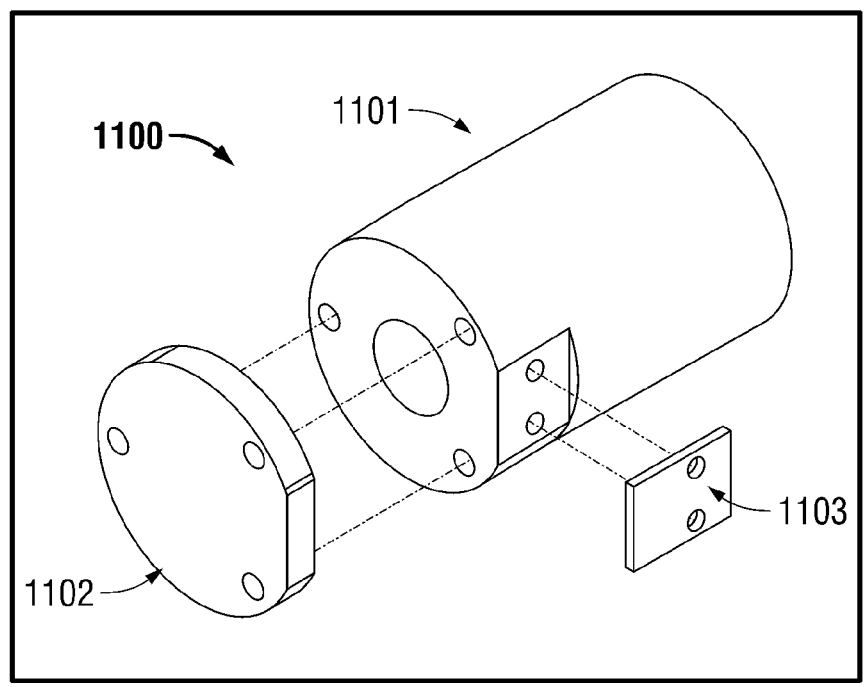
FIG. 11A is an illustration of an assembly
Figure 11B:
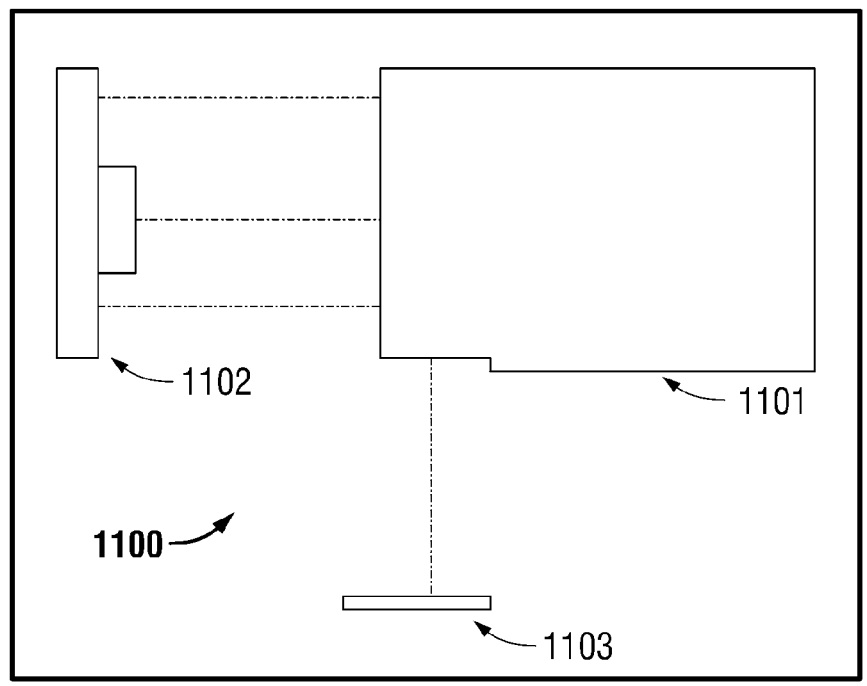
FIG. 11B is an illustration of an assembly.

As a further example, consider an assembly 1100 as illustrated in FIG. 11A and FIG. 11B. The assembly 1100 consists of a long cylindrical part 1101, a small cylindrical part 1102, and a prismatic part 1103.

Figure 11C:
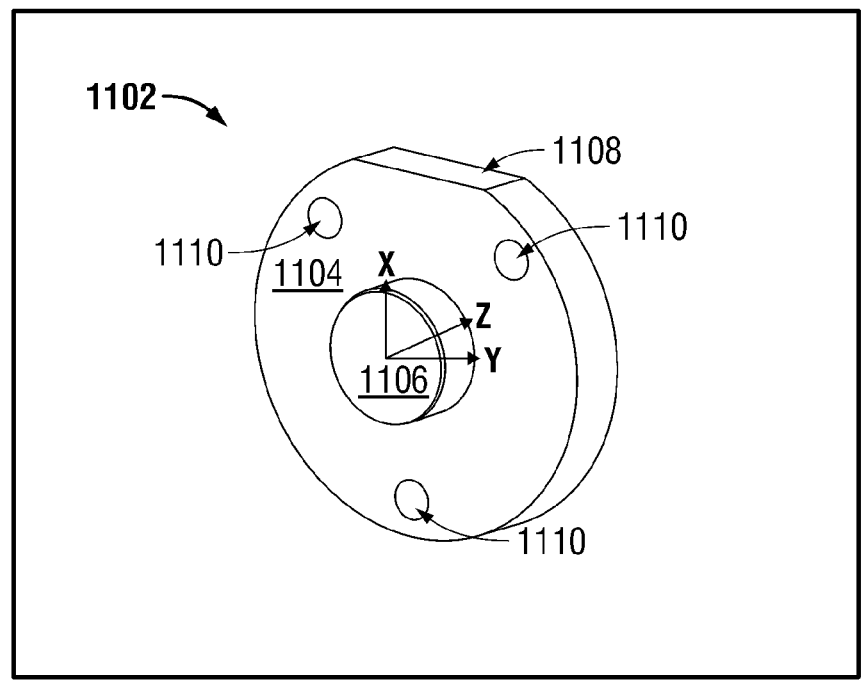
FIG. 11C is an illustration of a part in an assembly.

Referring now to FIG. 11C, the small cylindrical part 1102 is shown. The small cylindrical part 1102 has several tolerance features, including a face 1104 that is a mated feature to a face belonging to the long cylindrical part 1101 shown in FIGS. 11A and 11B. The part also has a center pin 1106. The top 1108 of the small cylindrical part 1102 has been flattened. Additionally, the part 1102 has three hole features 1110 that form a pattern feature.

Figure 11D:
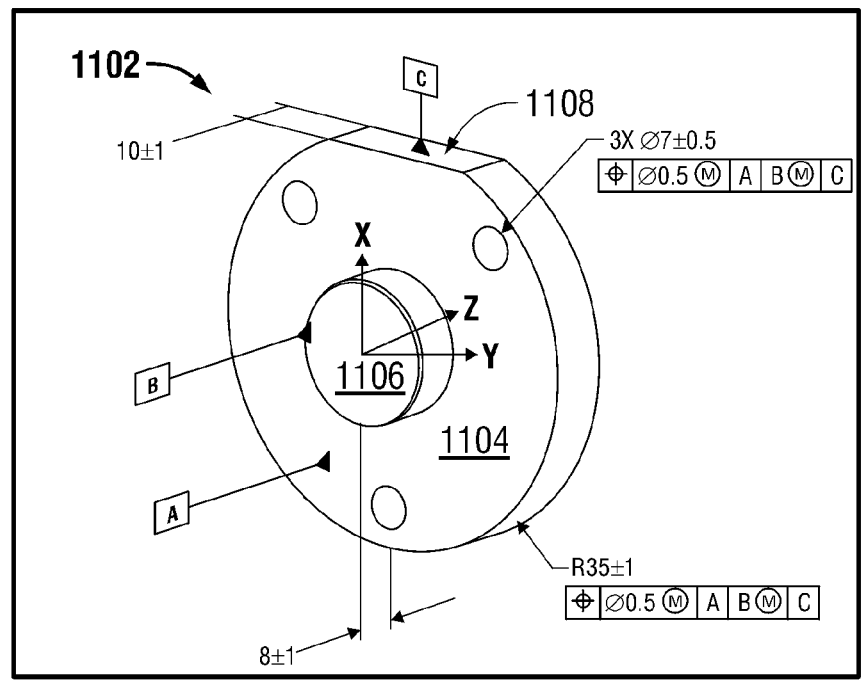
FIG. 11D is an illustration of a part with tolerances defined.

FIG. 11D illustrates the part 1102 with some tolerances. The face 1104, a face on the center pin 1106 that is perpendicular to face 1104, and the flattened top 1108 are the primary, secondary, and tertiary datum references, respectively. The primary, secondary, and tertiary datum references were chosen as such because the datums are mated features to the large cylindrical part 1101 (shown in FIGS. 11A and 11B).

The tolerances shown in FIG. 11D are in the units used by the computerized modeling system and in accordance with the ISO or ASME standard (depending on which standard is indicated to the computerized modeling system). The plus/minus tolerance for the depth of the flattened top 1108 is 10±1. The plus/minus tolerance for the radius of the face 1104 is 35±1. The three hole features 1110 have a plus/minus tolerance of 7±0.5. FIG. 11D does not show form or orientation tolerances, the calculation of which may have been overridden by the engineer.

FIG. 11E shows a table 1112 that may be generated to determine whether the part 1102 contains under-constrained, over-constrained, or fully constrained tolerance features. In the first column of the table, the tolerance features are listed in the order in which the features need to be manufactured. For example, the features identified as mating face, center pin, and flat correspond to the primary, secondary, and tertiary datum reference frames (i.e., face 1104, the face on the center pin 1106 that is perpendicular to face 1104, and the flattened top 1108). The Pattern feature is listed in the last row of the first column because the three hole features (denoted as Cyl1, Cyl2, and Cyl3) must be created prior to the existence of the pattern. The remaining columns in the table 1112 list the degrees of freedom, and size and form degrees of control.

To ensure that each tolerance feature is fully constrained from a tolerance perspective, required tolerances are defined for each unconstrained degree of control (e.g., a missing size, a missing orientation control, a missing location control, a missing form or missing refinement form, which is a form tolerance that further refines another form tolerance).

In the table 1112, an "X" denotes that the respective tolerance feature has been constrained by one or more existing tolerances for a particular degree of control. When an "X" appears in each column that is associated with all the degrees of control necessary to constrain a specific feature, the feature is fully constrained. If an "X" does not appear in a column that is associated with a degree of control necessary to constrain the specific feature, the feature is under-constrained. If more than one "X" appears in a column that is associated with a degree of control necessary to constrain the specific feature or when an "X" appears in a column that is associated with a degree of control unnecessary to constrain a feature, the feature is over-constrained. In one embodiment, the table 1112 is displayed on the CRT to make the engineer aware of the constraint status. Furthermore, under, over, and fully constrained features may be displayed using different color attributes.

As previously mentioned, the units used in the tolerance schemes are the same units used by the computerized modeling system, and therefore, readily obtained. Moreover, a part document that contains the definition of a part also indicates whether the part is based upon the ASME or ISO standard, thus the GTS procedure 800 can ascertain which standard to use when calculating the tolerance definitions.

Figure 12:
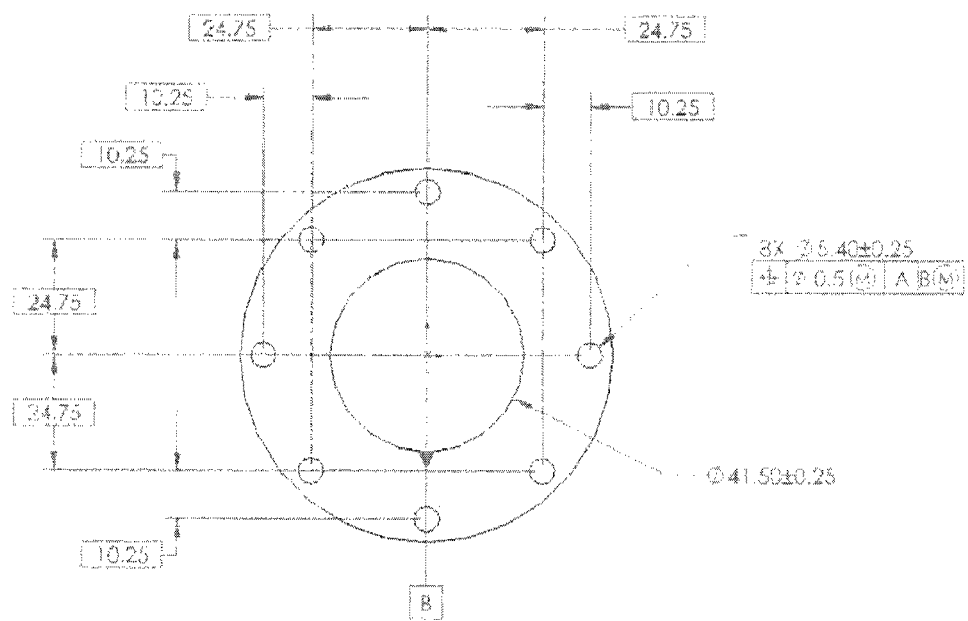
FIG. 12 is an illustration of basic dimensions annotating a 2D drawing.

Referring to FIG. 12, in addition to the functionality heretofore described, the present invention calculates and displays basic dimensions that specify interrelationships between features for geometric controls such as position, angularity, and profile. Given a geometric control, the basic dimensions between the datums and other tolerance features are provided. In FIG. 12, the basic dimensions are numbers displayed in an enclosed box. The engineer has the option of representing the dimensions as baseline dimensions, or as shown in FIG. 12, chain dimensions. Moreover, the basic dimensions can annotate a 2D drawing or a 3D model.

An advantage of the present invention is that an engineer may add new modeling features to a model and execute the GTS procedure 800 again without impacting existing tolerances. Furthermore, the GTS procedure 800 is sensitive to tolerances defined by an engineer during the design process and does not recalculate the tolerances defined by a procedure (e.g., importation) other than the GTS procedure 800.

Other advantages include the ability to apply tolerances to entire parts and assemblies, specified parts or features, and individual features. The automatic deduction of over-constrained and under-constrained features in a part provides an efficient means to create tolerances for a 3D model, and the ability to inform the engineer of over-constrained and under-constrained features in a design model is a valuable learning aide for the engineer. Moreover, the tolerances that are automatically generated are based upon standard practices (e.g., feature to datum reference frame relationships).

FIG. 12 shows a computerized modeling system 1300 that includes a CPU 1302, a CRT 1304, a keyboard input device 1306, a mouse input device 1308, and a storage device 1310. The CPU 1302, CRT 1304, keyboard 1306, mouse 1308, and storage device 1310 can include commonly available computer hardware devices. For example, the CPU 1302 can include a Pentium-based processor. The mouse 1308 may have conventional left and right buttons that the user may press to issue a command to a software program being executed by the CPU 1302. As an alternative or in addition to the mouse 1308, the computerized modeling system 1300 can include a pointing device such as a trackball, touch-sensitive pad, or pointing device and buttons built into the keyboard 1306. Those of ordinary skill in the art appreciate that the same results described herein with reference to a mouse device can be achieved using another available pointing device. Other appropriate computer hardware platforms are suitable as is apparent from the discussion herein. Such computer hardware platforms are preferably capable of operating the Microsoft Windows NT, Windows 98, Windows 2000, Windows XP, Windows ME, UNIX, Linux, or MAC OS operating systems.

Additional computer processing units and hardware devices (e.g., rapid prototyping, video, and printer devices) may be included in the computerized modeling system 1300. Furthermore, the computerized modeling system 1300 may include network hardware and software thereby enabling communication to a hardware platform 1312, and facilitating communication between numerous computer systems that include a CPU and a storage system, among other computer components.

Computer-aided modeling software may be stored on the storage device 1310 and may be loaded into and executed by the CPU 1302. The modeling software allows a user to create and modify a 3D model and implements aspects of the invention described herein. The CPU 1302 uses the CRT 1304 to display a 3D model and other aspects thereof as described. Using the keyboard 1306 and the mouse 1308, the user can enter and modify data associated with the 3D model. The CPU 1302 accepts and processes input from the keyboard 1306 and mouse 1308. The CPU 1302 processes the input along with the data associated with the 3D model and makes corresponding and appropriate changes to that which is displayed on the CRT 1304 as commanded by the modeling software. In one embodiment, the modeling software is based on a solid modeling system that may be used to construct a 3D model consisting of one or more solid and surface bodies. However, the present invention can be utilized to deform a model that is internally represented in any form. Additionally, the modeling software may allow for relationships that parametrically constrain the definitions of one or more bodies or features therein with respect to one another. If a parametrically constrained relationship exists between two features, a geometric modification to one feature may cause a geometric modification in the other feature.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

A number of embodiments of the present invention have been described. Nevertheless, it will be understood that various modifications may be made without departing from the spirit and scope of the invention. For example, implementations may change the order in which operations are performed. Furthermore, depending on the needs of an implementation, particular operations described herein may be implemented as a combined operation, eliminated, added to, or otherwise rearranged.

Moreover, in one embodiment, step 808 in FIG. 8 can recognize other cross-part associations in addition to mate relationships. Such cross-part associations, by way of non-limiting example, include in-context relationships, which those of ordinary skill in the art can identify in a data structure defining a model. Additionally, the description of step 812 in FIG. 8 describes faces as mate features. Additionally, the mate recognition step may also include mate features such as slots, tabs, and hole patterns.

Furthermore, in step 814 (which describes manufacturing order), other criteria may be considered in addition to existing tolerances and the master data reference frame. In addition, an engineer may be allowed to override a manufacturing order that is automatically determined.

An implementation of the present invention may allow for other tolerance types, such as limit dimensioning. In such an implementation, the ISO 2768 tolerances for linear and angular dimensions are supported.

Accordingly, other embodiments are within the scope of the following claims.

What is claimed is:

1. A computer-implemented method for automatic generation of a tolerance scheme, the method comprising:
   accessing data defining a three-dimensional model that defines a part for manufacture;
   identifying a tolerance feature in the three-dimensional model;
   determining at least one unconstrained degree of control for the tolerance feature by constructing a data structure storing information about a plurality of degrees of control relevant to the tolerance feature; and for each degree of control relevant to the tolerance feature, indicating in the data structure that the degree of control is one of controlled, required to be controlled, and not required to be controlled;
   marking in the data structure that one of the plurality of degrees of control is controlled when a pre-existing constraint is applicable to said one of the plurality of degrees of control of the tolerance feature;
   automatically creating a tolerance scheme for the tolerance feature;
   rendering the tolerance scheme and the three-dimensional model in a window such that the tolerance scheme annotates the tolerance feature; and
   wherein the tolerance scheme is based on an engineering standard for communicating a tolerance; and
   the tolerance scheme constrains the unconstrained degree of control.

2. The computer-implemented method of claim 1, wherein the tolerance scheme comprises one of a dimension, a size, an orientation, or a form tolerance.

3. The computer-implemented method of claim 1, wherein determining at least one unconstrained degree of control for the tolerance feature comprises constructing a table for identifying whether the tolerance feature is one of fully constrained, over-constrained, and comprised of unconstrained degrees of control.

4. The computer-implemented method of claim 1, wherein automatically creating a tolerance scheme for the tolerance feature comprises analyzing a feature type of the tolerance feature for determination of an appropriate tolerance.

5. The computer-implemented method of claim 4, wherein the feature type of the tolerance feature is a plane and the tolerance scheme comprises a form tolerance formulation.

6. The computer-implemented method of claim 4, further comprising analyzing a geometric relationship between the tolerance feature and a datum reference frame.

7. The computer-implemented method of claim 6, wherein the geometric relationship is perpendicular and the tolerance scheme comprises a perpendicularity tolerance formulation.

8. The computer-implemented method of claim 4, further comprising applying at least one user-defined attribute for at least one of a location, a size, an orientation, a form, and an angle tolerance specification.

9. The computer-implemented method of claim 1, wherein the three-dimensional model is rendered as a two-dimensional drawing in the window.

10. The computer-implemented method of claim 1, further comprising:
    identifying a second tolerance feature in the three-dimensional model;
    determining a plurality of required degrees of control necessary to constrain the second tolerance feature to control at least one of orientation and location;
    indicating whether each of the plurality of required degrees of control is one of controlled, required to be controlled, and not required to be controlled;
    automatically creating a tolerance scheme for the second tolerance feature; and
    annotating the second tolerance feature by rendering the second tolerance scheme in the window with the second tolerance feature.

11. A computer-readable data storage medium comprising instructions for causing a computer system to:
    create a constraint for an initially unconstrained degree of control of a tolerance feature in a three-dimensional model of computer aided design;
    represent the constraint as a tolerance scheme displayed in a window and annotating the tolerance feature; and
    wherein a type of the tolerance feature determines a tolerance type to include in the tolerance scheme;
    the type of the tolerance feature determines a degree of control required by the constraint, the degree of control being the initially unconstrained degree of control, and the degree of control being listed in a data structure configured to indicate one or more degrees of control required for the tolerance feature, the data structure enabling one of the degrees of control listed in the data structure to be marked as controlled when a pre-existing constraint is applicable to said one of the degrees of control of the tolerance feature; and
    an attribute supplies a value for the degree of control.

12. The computer-readable data storage medium of claim 11, wherein the tolerance scheme is comprised of one or more standard geometric dimension and tolerance symbols.

13. The computer-readable data storage medium of claim 11, wherein the degree of control is one of location, size, orientation, form, and angle.

14. The computer-readable data storage medium of claim 11, further comprising instructions to build the data structure listing the degree of control required for the tolerance feature.

15. The computer-readable data storage medium of claim 11, further comprising applying a pre-existing constraint to the tolerance feature.

16. A computer-aided design system comprising:
- a processor operatively coupled to a data storage system, the data storage system storing a three-dimensional model; and
- a data storage memory operatively coupled to the processor and comprising instructions to configure the processor to:
  - construct a data structure listing a plurality of degrees of control required to constrain a tolerance feature, wherein the plurality of degrees of control required are determined by a type of the tolerance feature;
  - mark one of the plurality of degrees of control listed in the data structure as controlled when a pre-existing constraint is applicable to the one of the plurality of degrees of control;
  - calculate a tolerance for a second one of the plurality of degrees of control, wherein calculating applies an attribute specified for the second one of the plurality of degrees of control; and
  - display a tolerance scheme that represents the tolerance, wherein the tolerance scheme annotates the tolerance feature in one of a two-dimensional or a three-dimensional view of a model comprised of the tolerance feature.

17. The computer-aided design system of claim 16, further comprising instructions to configure the processor to:
- recognize that a size control is comprised of a diameter specification for a tolerance feature that is a hole or a sphere, a depth specification for a tolerance feature that is a hole, and a length and width specification for a tolerance feature that is a slot;
- recognize that a form control is comprised of at least one of a circularity, a cylindricity, a flatness, and a profile specification;
- recognize that an orientation control is comprised of at least one of a parallelism, a perpendicularity, and an angularity specification; and
- recognize that a location control is comprised of at least one of a position, a linear plus and minus, and a profile specification.

18. The computer-aided design system of claim 16, wherein the attribute applied has one of a default value and a user-specified value.

19. The computer-aided design system of claim 16, further comprising instructions to configure the processor to utilize standard geometric dimension and tolerance symbols in the tolerance scheme.

* * * * *

UNITED STATES PATENT AND TRADEMARK OFFICE
CERTIFICATE OF CORRECTION

PATENT NO. : 7,590,497 B2　　　　　　　　　　　　　　　　　　　　　　　　Page 1 of 1
APPLICATION NO. : 11/243354
DATED : September 15, 2009
INVENTOR(S) : Tornquist et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 699 days.

Signed and Sealed this

Twenty-first Day of September, 2010

David J. Kappos
*Director of the United States Patent and Trademark Office*